(12) United States Patent
LeDuc et al.

(10) Patent No.: US 12,092,108 B2
(45) Date of Patent: Sep. 17, 2024

(54) BEARING MECHANICAL JOINING METHODS

(71) Applicant: Hamilton Sundstrand Corporation, Charlotte, NC (US)

(72) Inventors: Zachary Allen Ray LeDuc, Rockford, IL (US); Edward W. Goy, Crystal Lake, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/751,086

(22) Filed: May 23, 2022

(65) Prior Publication Data

US 2023/0374985 A1     Nov. 23, 2023

(51) Int. Cl.
*F04C 2/18*     (2006.01)

(52) U.S. Cl.
CPC ............ *F04C 2/18* (2013.01); *F04C 2240/50* (2013.01); *F04C 2240/54* (2013.01); *F04C 2240/56* (2013.01); *F04C 2240/80* (2013.01); *F04C 2240/805* (2013.01)

(58) Field of Classification Search
CPC .... F04C 2/18; F04C 2240/50; F04C 2240/54; F04C 2240/56; F04C 2240/80; F04C 2240/805
See application file for complete search history.

(56) References Cited

U.S. PATENT DOCUMENTS

| | | | |
|---|---|---|---|
| 2,915,981 A | 12/1959 | Norlin | |
| 2,972,959 A | 2/1961 | Wilson et al. | |
| 3,002,464 A * | 10/1961 | Lee | F16C 17/26 417/DIG. 1 |
| 3,055,307 A * | 9/1962 | Thrap | F04C 15/0026 418/132 |
| 3,137,239 A | 6/1964 | Dahl | |
| 3,427,984 A | 2/1969 | Slevin | |
| 3,752,608 A | 8/1973 | Knowles et al. | |
| 9,303,529 B2 | 4/2016 | Schelonka | |
| 2016/0123390 A1* | 5/2016 | Kovach | F04C 15/0088 418/206.7 |
| 2020/0025195 A1* | 1/2020 | Poteet | F04C 2/084 |

FOREIGN PATENT DOCUMENTS

| | | | | |
|---|---|---|---|---|
| EP | 3453903 A1 * | 3/2019 | ............. | F01C 21/02 |
| EP | 3715634 A1 * | 9/2020 | ................ | F02C 7/22 |

OTHER PUBLICATIONS

Extended European Search Report for European Application No. 23174080.4; Report Mail Date Sep. 28, 2023 (10 Pages).

* cited by examiner

*Primary Examiner* — Dominick L Plakkoottam
*Assistant Examiner* — Paul W Thiede
(74) *Attorney, Agent, or Firm* — CANTOR COLBURN LLP (57) ABSTRACT

A bearing assembly includes a first gear shaft aligned with a first axis and a second gear shaft aligned with a second axis. The second axis is oriented parallel to the first axis. A first bearing is supported on the first gear shaft and a second bearing is supported on the second gear shaft. A coupling mechanism extends between and radially clamps the first bearing to the second bearing. The coupling mechanism is operable to restrict relative radial movement between the first bearing and the second bearing.

12 Claims, 6 Drawing Sheets

BEARING MECHANICAL JOINING METHODS

BACKGROUND

Exemplary embodiments of the present disclosure relate to the art of external gear pumps, and more particularly, to a mechanical assembly for maintaining a relative position of the journal bearings of a gear pump.

Gear pumps are operable to pump fluid from an inlet to an outlet. Fluid enters the inlet and travels between the teeth of the gears and the surrounding housing. As the gears turn, the fluid is pulled towards the outlet and squeezed out of the pump. Both the drive gear and the driven gear are supported within the gear pump by respective gear shafts. Each gear shaft is in turn supported by both a pressure loaded journal bearing and a stationary journal bearing, both of which react to the load of the gear shaft.

In gear pumps with this type of bearing configuration, a known physical phenomenon sometimes occurs called radial clamping. When no pressure differential exists across the gear pump (and therefore around the outer perimeter of the bearings), there is no hydraulic force that causes the bearings to be pushed together on the flats of the bearings. Accordingly, until sufficient pressure builds across the pump and around the bearings, the two independent bearings, such as the two stationary journal bearings or the two pressure loaded journal bearings, remain separated from each other along the flat surfaces thereof. This separation may result in increased leakage internal to the pump and decreased volumetric efficiency.

BRIEF DESCRIPTION

According to an embodiment, a bearing assembly includes a first gear shaft aligned with a first axis and a second gear shaft aligned with a second axis. The second axis is oriented parallel to the first axis. A first bearing is supported on the first gear shaft and a second bearing is supported on the second gear shaft. A coupling mechanism extends between and radially clamps the first bearing to the second bearing. The coupling mechanism is operable to restrict relative radial movement between the first bearing and the second bearing.

In addition to one or more of the features described above, or as an alternative, in further embodiments the first bearing includes a first flat bearing surface and the second bearing includes a second flat bearing surface, the coupling mechanism being operable to restrict radial movement between the first flat bearing surface and the second flat bearing surface.

In addition to one or more of the features described above, or as an alternative, in further embodiments the coupling mechanism extends between the first flat bearing surface and the second flat bearing surface.

In addition to one or more of the features described above, or as an alternative, in further embodiments the coupling mechanism further comprises a first portion mounted to the first bearing and protruding radially outwardly from the first bearing towards the second bearing and a second portion located at the second bearing, the second portion being configured to receive the first portion.

In addition to one or more of the features described above, or as an alternative, in further embodiments the first portion includes a key and the second portion includes a plate having a keyhole formed therein, the key being receivable within the keyhole.

In addition to one or more of the features described above, or as an alternative, in further embodiments the key has a body and a radial flange arranged near an end of the body, and the keyhole has a non-uniform configuration extending between a first end and a second end thereof, the flange being receivable within the first end of the keyhole but not the second end of the keyhole.

In addition to one or more of the features described above, or as an alternative, in further embodiments the coupling mechanism is spring-loaded.

In addition to one or more of the features described above, or as an alternative, in further embodiments comprising a biasing member having a biasing force acting on the key and a retaining clip movable relative to the key between an engaged position and a disengaged position. In the engaged position, the retaining clip opposes the biasing force of the biasing member.

In addition to one or more of the features described above, or as an alternative, in further embodiments the retaining clip is in the engaged position when the key is inserted into a first end of the keyhole.

In addition to one or more of the features described above, or as an alternative, in further embodiments the first portion includes a tenon and the second portion includes a mortise.

In addition to one or more of the features described above, or as an alternative, in further embodiments comprising a fastener rigidly affixing the tenon to the mortise.

In addition to one or more of the features described above, or as an alternative, in further embodiments the first portion includes a protrusion and the second portion includes a clevis having a clearance, the protrusion being receivable within the clearance.

In addition to one or more of the features described above, or as an alternative, in further embodiments comprising a fastener coupling the protrusion to the clevis.

In addition to one or more of the features described above, or as an alternative, in further embodiments the first portion includes an expanding pin.

In addition to one or more of the features described above, or as an alternative, in further embodiments the first bearing and the second bearing are stationary bearings.

In addition to one or more of the features described above, or as an alternative, in further embodiments the first bearing and the second bearing are pressure loaded bearings.

According to an embodiment, a gear pump includes a housing having an inlet and an outlet, a first gear mounted within the housing to a first gear shaft, a second gear mounted within the housing to a second gear shaft, a first bearing supported on the first gear shaft, a second bearing supported on the second gear shaft, and a coupling mechanism extending between and radially clamping the first bearing to the second bearing. The coupling mechanism is operable to restrict relative radial movement between the first bearing and the second bearing.

In addition to one or more of the features described above, or as an alternative, in further embodiments the first bearing and the second bearing are stationary bearings.

In addition to one or more of the features described above, or as an alternative, in further embodiments the first bearing and the second bearing are pressure loaded bearings.

In addition to one or more of the features described above, or as an alternative, in further embodiments the first bearing includes a first flat bearing surface and the second bearing includes a second flat bearing surface, the coupling mechanism being operable to restrict relative radial movement between the first flat bearing surface and the second flat bearing surface.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
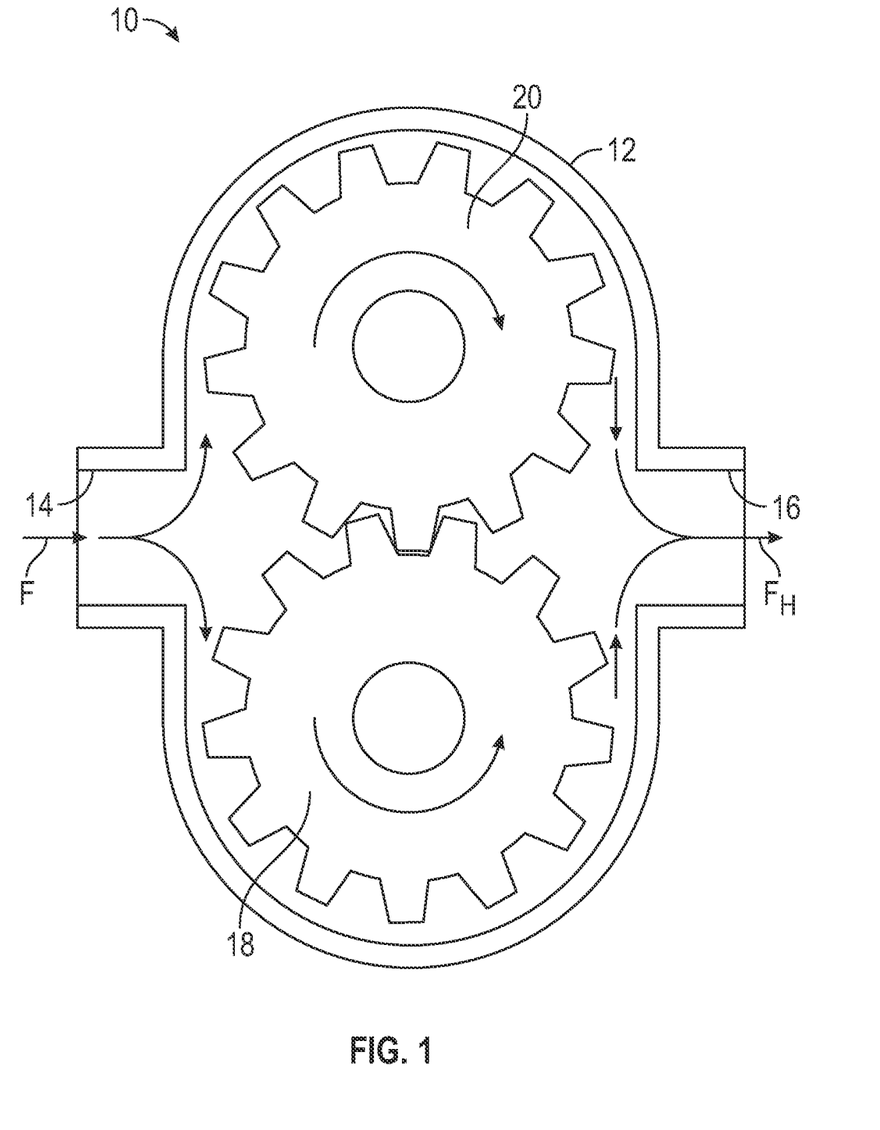
FIG. 1 is a schematic, cross-sectional view of a gear pump showing the approximate direction of loads affecting both drive and driven gears of the gear pump.

FIG. 1 is a schematic, cross-sectional view of an example of a gear pump 10 according to an embodiment. As shown, the gear pump 10 includes a housing 12 having a gear pump inlet 14 and a gear pump outlet 16. Although the inlet 14 and the outlet 16 are arranged at opposite sides of the housing 12, embodiments where the inlet 14 and outlet 16 are arranged in another configuration relative to the housing 12 are also contemplated herein. A first gear or drive gear 18 and a corresponding second gear or driven gear 20 are mounted within the interior of the housing 12 between the inlet 14 and the outlet 16.

The gear pump is operable to pump a fluid at a constant rate between the inlet 14 and the outlet 16. As shown a fluid F enters the housing 12 of the gear pump 10 at the inlet 14. Using a relatively low supplied inlet pressure, the fluid F fills into the gaps between the teeth of drive gear 18 and the housing 12 and between the teeth of the driven gear 20 and the housing 12. The drive gear 18 is rotated in a first direction about a first axis, such as counterclockwise for example, and the driven gear 20 is in turn rotated in a second, opposite direction, such as clockwise for example, about a second axis. As the gears 18 and 20 turn, the fluid F is moved from the relative low pressure inlet 14 towards the relatively high pressure outlet 16, In an embodiment, the fluid F is squeezed form the outlet of the housing 12 as a high pressure fluid $F_H$.

Figure 2:
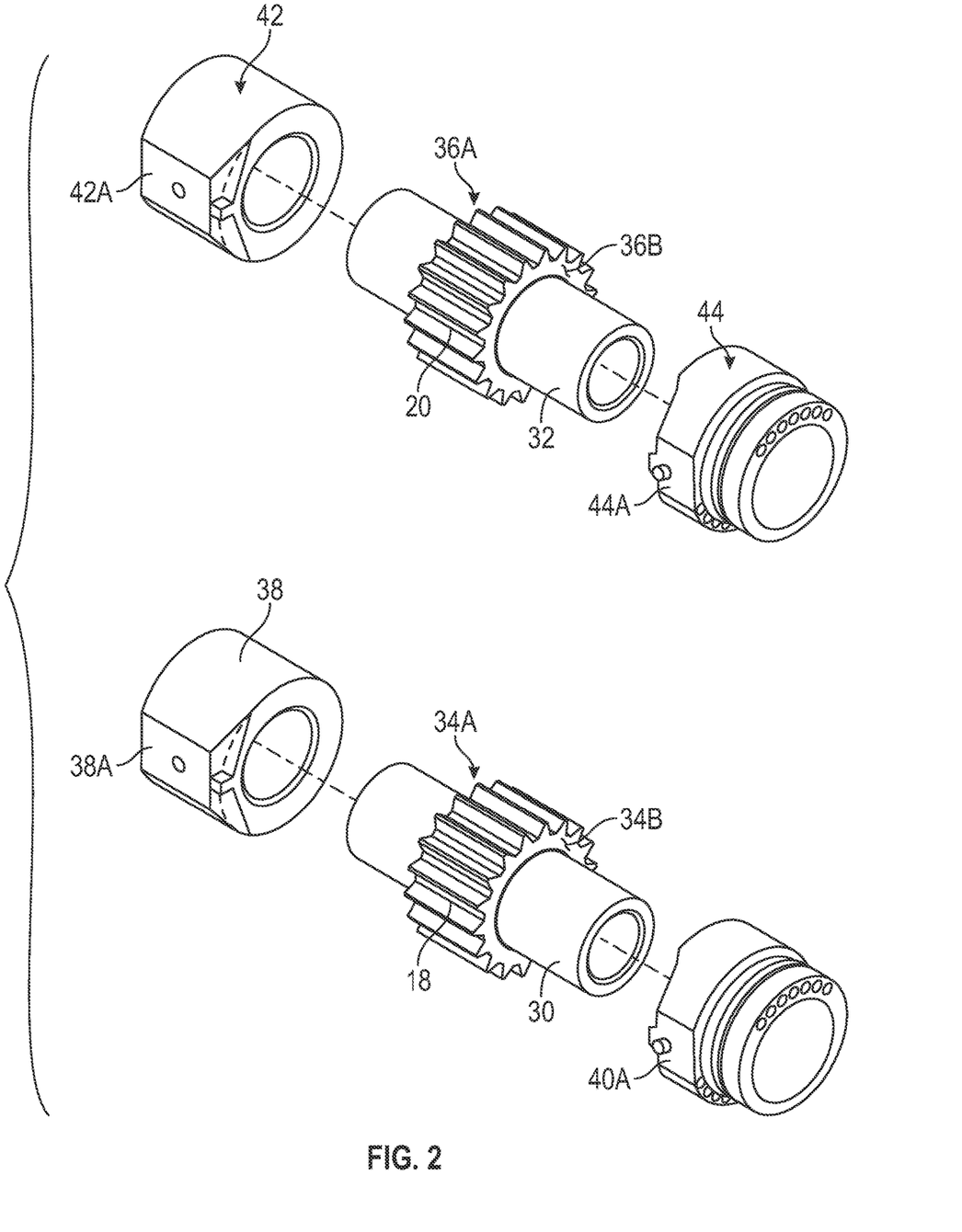
FIG. 2 is an exploded perspective view of a gear pump including a pair of drive-side bearings and a pair of driven-side bearings.

With reference now to FIG. 2, an exploded, perspective view of drive gear 18 and driven gear 20 is shown. As was also shown in FIG. 1, drive gear 18 is meshable with driven gear 20, which are mounted to a drive gear shaft 30 and a driven gear shaft 32, respectively. The drive gear has axially opposed gear faces 34A, 34B, and is mounted to a first (or drive) gear shaft 30. Similarly, driven gear 20 has axially opposed gear faces 36A, 36B and is mounted to a second (or driven) gear shaft 32. To form one journal bearing assembly, one or both longitudinal ends of first, or drive-side, gear shaft 30, can be respectively received in central recesses of a drive-side stationary journal bearing 38 and drive-side pressure loaded journal bearing 40 Another journal bearing assembly can include one or both longitudinal ends of second, or driven-side, gear shaft 32, which are in turn respectively received by driven-side stationary journal bearing 42 and driven-side pressure loaded journal bearing 44. Each pair of journal bearings can thus respectively support drive-side gear shaft 30 and/or driven-side gear shaft 34.

Stationary journal bearings 38, 42 are each fixed in place, for example, against housing 12 (shown in FIG. 1), whereas pressure loaded (or "floating") journal bearings 40, 44 can translate axially relative to respective gear shafts 30, 32. Loads experienced by drive gear 18 are transferred to gear shaft 30. Since drive-side stationary journal bearing 38 and drive-side pressure loaded journal bearing 40 react to the loads experienced by gear shaft 30, bearings 38 and 40 also react to many of the loads experienced by drive gear 18. Similarly, loads experienced by driven gear 20 are transferred to gear shaft 34. Since driven-side stationary journal bearing 42 and driven-side pressure loaded journal bearing 44 react to the loads second gear shaft 32, bearings 40 and 42 also react many of the loads experienced by driven gear 20.

Each of bearings 38, 40, 42, 44 comprises a ring-like structure that has a flat bearing surface, 38A, 40A, 42A, 44A. Thus, such bearing surfaces 38A, 40A, 42A, 44A extend substantially parallel to the direction of the corresponding gear shaft 30, 32 passing therethrough.

With reference now to FIGS. 3-7, in an embodiment, the bearings within at least one of the pair of stationary journal bearings 38, 42 and the pair of pressure loaded journal bearings 40, 44 are connected by a coupling mechanism 50 to restrict relative radial movement therebetween. The coupling mechanism 50 is configured to restrict the clearance between the flat surfaces on the pair of bearings 38, 42, or 40, 44, even when no pressure differential exists across the gear pump 10. In each of the illustrated, non-limiting embodiments, the coupling mechanism 50 includes a first portion 52 mounted to a first bearing, such as bearing 44 for example, and a complementary second portion 54 mounted to the second bearing of the bearing pair, such as bearing 40 for example.

Figure 3A:
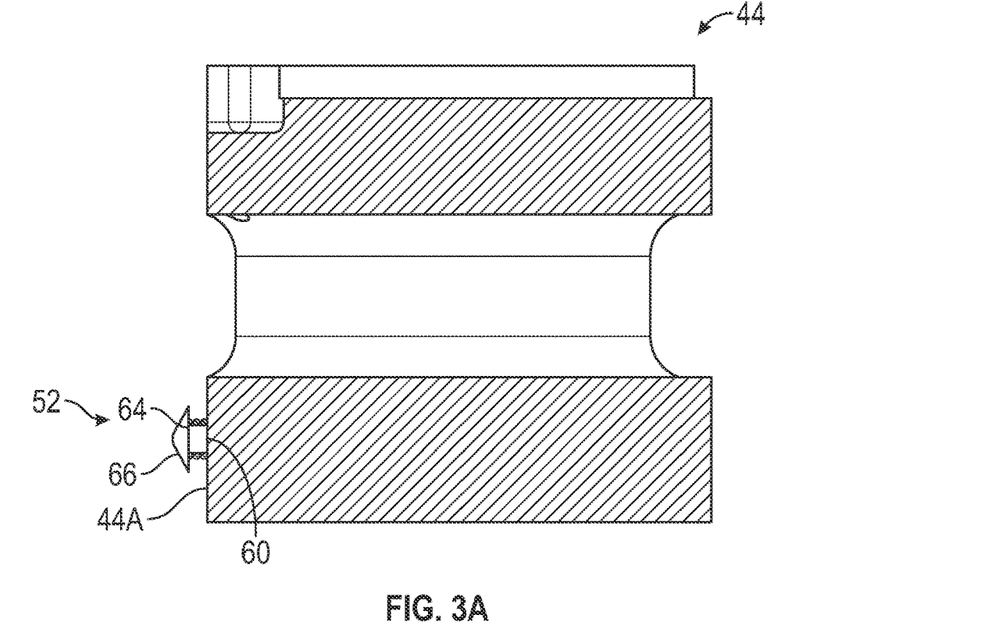
FIG. 3A is a plan view of a first bearing of a gear pump including a first portion of a coupling mechanism according to an embodiment.
Figure 3B:
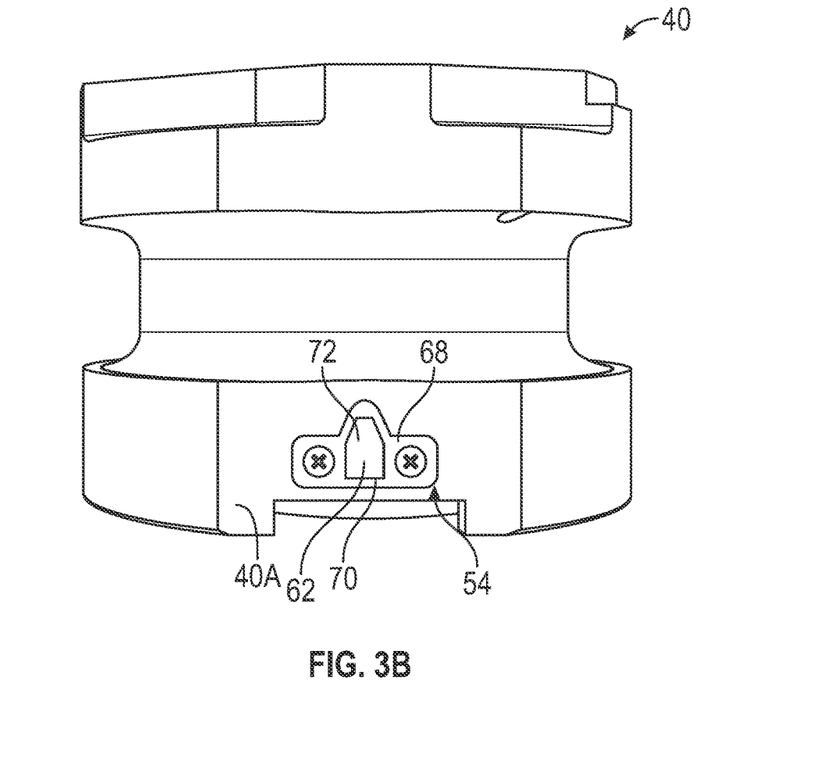
FIG. 3B is a side view of a second bearing of a gear pump including a second portion of a coupling mechanism according to an embodiment.

In the non-limiting embodiment illustrated in FIGS. 3A and 3B, the first portion 52 of the coupling mechanism 50 includes a key 60 and the second portion 54 of the coupling mechanism 50 includes a corresponding keyhole 62. As shown, the key 60 extends at an angle from the flat surface 44A of bearing 44. The key 60 may be attached to the bearing in any suitable manner, such as via threaded engagement or press-fit for example. The key 60 has a non-uniform configuration over its length. In the illustrated, non-limiting embodiment, a diameter of the distal or free end 64 of the key 60 is greater than the diameter of the key 60 adjacent to the bearing surface 4A. For example, the key 60 may include a radially outwardly extending flange 66 located at or near the distal end 64 thereof.

A plate 68 having an opening or keyhole 62 formed therein is mounted to the flat surface 40A of the other bearing 40 of the bearing pair. The plate 68 may be mounted in any suitable manner, such as via an adhesive, a plurality of fasteners, such as a screw or bolt for example, or alternatively, may be press fit about the bearing. In an embodiment, a groove (not shown) corresponding to the keyhole 62 may be formed in the surface of the bearing 40A underneath the keyhole 62 as needed. As shown, the keyhole 62 also has a non-uniform configuration. Near a first end 70, the dimensions of the keyhole 62 are sized to receive the distal end 64 of the key 60 therein. However, at least one dimension of the keyhole 62 reduces, such as over an axial length of the keyhole 62 for example. Accordingly, the dimensions of the keyhole 62 adjacent to a second end 72 are substantially smaller than the dimensions of the keyhole 62 adjacent to the first end 70. Although a specific configuration of the keyhole 62 is illustrated in the FIGS., it should be understood that embodiments where the keyhole 62 has another suitable configuration are within the scope of the disclosure. Furthermore, although the first and second ends 70, 72 are illustrated as being opposite one another along an axis, embodiments where the second end 72 is arranged at an angle to the first end 70 are also contemplated herein.

Once the distal end 64 of the key 60 including the flange 66 is installed within the keyhole 62, the key 60 may be translated within the keyhole 62, towards the second opposite end 72 thereof. Because the keyhole 62 adjacent the second end 72 is smaller than the diameter of the flange 66, the engagement therebetween restricts axial movement of the key 60 relative to the keyhole 62, and therefore movement between the bearings 40, 44. Use of a coupling mechanism including a key 60 and a keyhole 62 as described herein will hold the bearings together more tightly than absent the coupling mechanism 50, while still allowing the bearings 40, 44 to retain all degrees of freedom. Further, the amount of radial clamping or unclamping may be controller by a tight tolerance stack-up from the key 60 to the keyhole 62.

Figure 4:
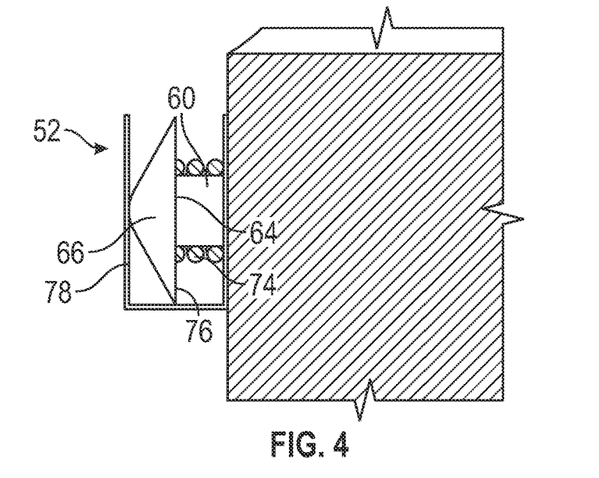
FIG. 4 is a plan view of a first bearing of a gear pump including a first portion of a coupling mechanism according to another embodiment.

With reference now to FIG. 4, the first portion 52 of the coupling mechanism 50 may be spring loaded. In the illustrated, non-limiting embodiment, the key 60 protruding from the surface 44A of a bearing 40 is spring loaded. As shown, a biasing member 74, such as a coil spring for example, may be mounted about the body of the key 60 and extend between the surface 44A of the bearing 44 and a surface 76 of the flange 66. The first portion 52 may additionally include a retaining clip 78 movable relative to the bearing 44, the key 60, and the biasing member 74 between an engaged or active position (FIG. 4) and a disengaged or inactive position. When the retaining clip 78 is in the engaged position, a portion of the retaining clip 78 is configured to contact or engage the distal end 64 of the key 60. Accordingly, the retaining clip 78 can be used not only to compress the biasing member 74, but also to retain the biasing member 74 in a compressed position.

Inclusion of the retaining clip 78 may facilitate installation of the key 60 within the keyhole 62. In such embodiments, the retaining clip 78 will remain in an engaged position during the initial insertion of the key 60 into the keyhole 62. For example, as the key 60 is inserted into the keyhole 62, the retaining clip 78 may apply a force to the biasing member 74 to compress the biasing member 74. During translation of the key 60 within the keyhole 62, the retaining clip 78 would engage a surface of the plate 68. This contact may cause the retaining clip 78 to slide relative to the key 60, thereby removing the force opposing the biasing member 74. With the retaining clip 78 removed, the biasing force of the biasing member 74 is configured to presses against the adjacent keyhole plate 68. However, it should be understood that in other embodiments, the retaining clip 78 need not separate from the key 60 and the biasing member 74. In an embodiment, the keyhole 62 includes a feature (not shown), such as a chamfer or radius formed at the leading edge thereof for example. This feature may be included to facilitate movement of the key 60 while maintaining a positive load on the biasing member 74 to restrict relative movement of the bearings.

In an embodiment, to enable the separation of the retaining clip 78 from the key 60 and biasing member 74, the retaining clip 78 may be slightly larger than the depth of the keyhole 62 plus the thickness of part of the plate 68. When in the disengaged position, the retaining clip 78 would still be retained in position within the keyhole 62 because of the connection formed between the bearings 40, 44 by the coupling mechanism 50. The spring load of the biasing member 74 forcing the bearings 40, 44 together prevents the retaining clip 78 from becoming loose and dislodging from the keyhole 62.

Figure 5A:
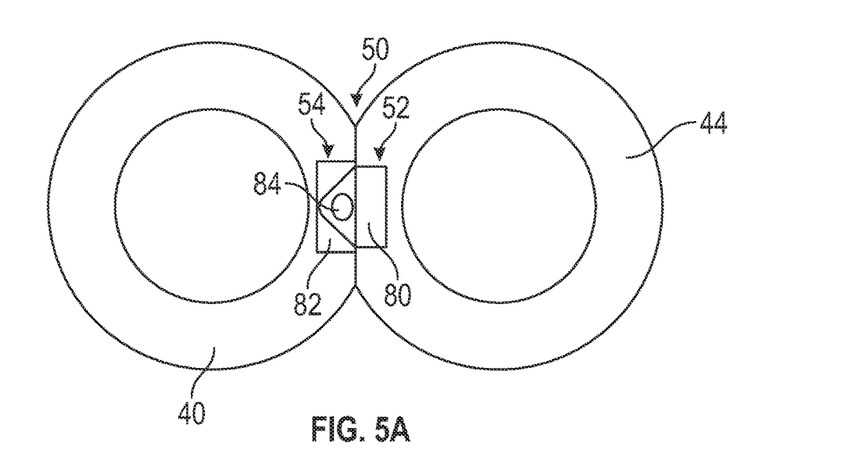
FIG. 5A is an end view of a first bearing and a second bearing connected by a coupling mechanism according to an embodiment.
Figure 5B:
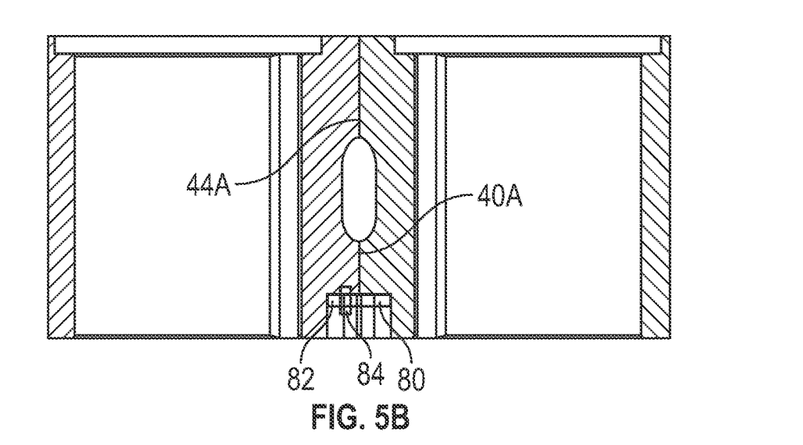
FIG. 5B is a plan view of the first bearing, second bearing, and coupling mechanism of FIG. 5A according to an embodiment.

With reference now to FIGS. 5A and 5B, in another embodiment the coupling mechanism 50 includes a joint, such as a mortise and tenon joint for example. In the illustrated, non-limiting embodiment, the first portion 52 of the coupling mechanism 50 includes a protrusion or tenon 80 extending therefrom, such as from the flat surface 44A or bearing 44. A protrusion 80 having any suitable shape, such as a protrusion that is uniform over its length, or varies over its length (as show), is contemplated herein. The second portion 54 of the coupling mechanism 50 includes a mortise, or an inwardly extending groove or opening 82 formed in the flat surface 40A of the other bearing 40. In such embodiments, the first portion 52 is insertable into or in overlapping arrangement with the second portion 54 such that a minimum clearance is defined between the adjacent flat surfaces 40A, 44A of the bearings 40. 44. To maintain the bearings 40, 44 in this configuration, a fastener 84, such as a pin for example, may extend through both the first portion 52 and the second portion 54 to maintain a rigid connection therebetween. Although a mortise and tenon are described herein, embodiments where the joint has another configuration are also contemplated herein. For example, one of the first portion 52 and the second portion 54 may have a clevis configuration with two parallel arms, and the other of the first portion 52 and the second portion 54 may have a protrusion receivable within the clearance defined between the two parallel arms. Similar to the mortise and tenon joint, a fastener, such as a clevis pin for example, may be receivable within the corresponding and aligned openings formed in the clevis arms and the protrusion. To restrict relative movement between the clevis and the protrusion.

Figure 6A:
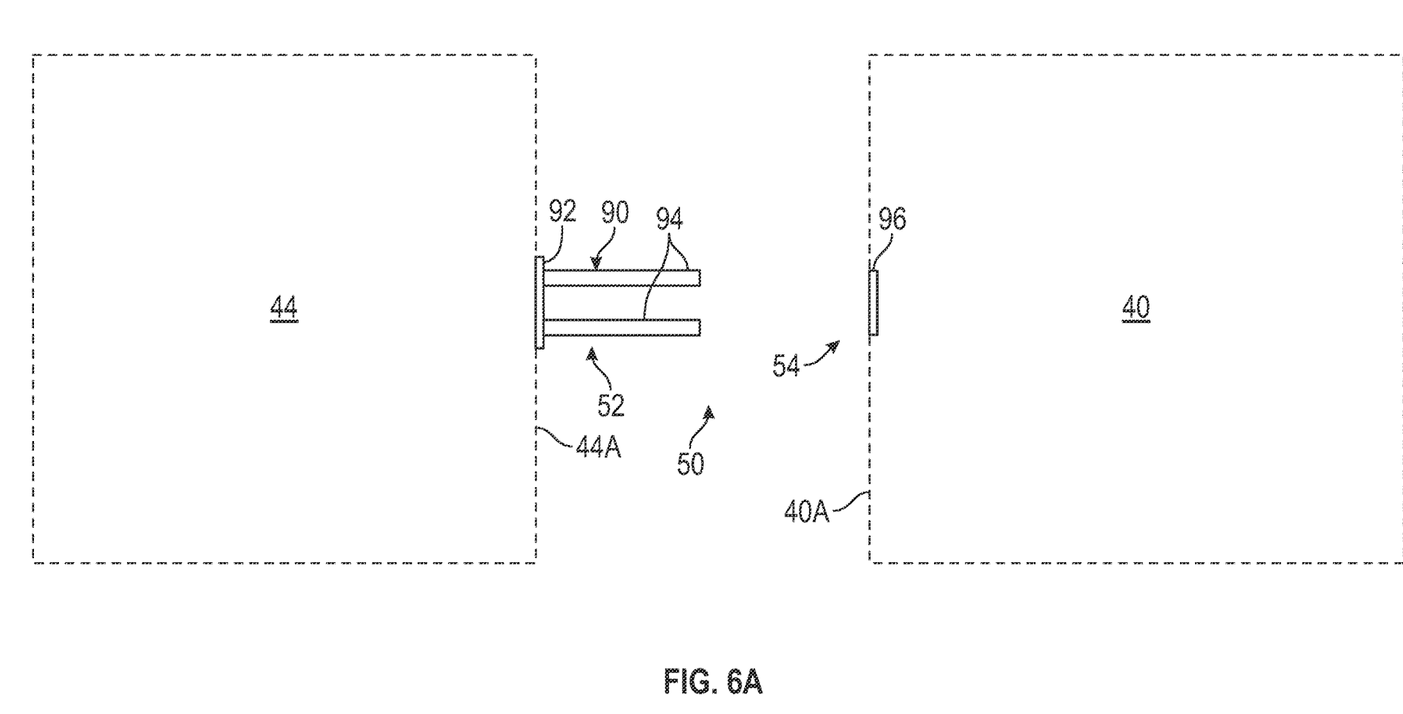
FIG. 6A is a plan view of a first bearing having a first portion of a coupling mechanism separated from a second bearing having a second portion of a coupling mechanism according to an embodiment.
Figure 6B:
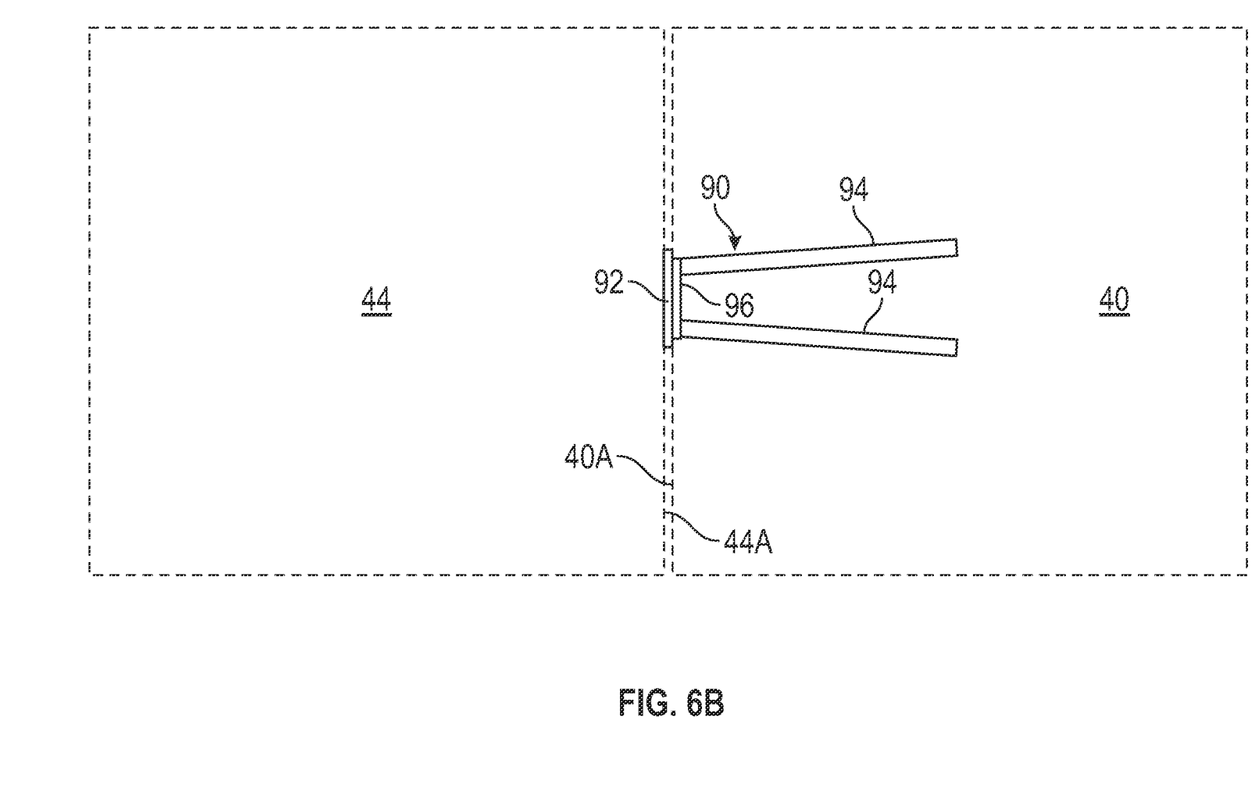
FIG. 6B is a plan view of the first bearing and the second bearing of FIG. 6A with the first portion and the second portion engaged according to an embodiment.

In yet another embodiment, best shown in FIGS. 6A and 6B, the first portion 52 of the coupling mechanism 50 includes an expanding pin 90. In the illustrated, non-limiting embodiment, the expanding pin 90 includes a base 92 and a plurality of legs 94 extending outwardly from the base 92 towards the opposite bearing 40. The plurality of legs 94 may be resilient and configured to bias radially outwardly. The second portion 54 of the coupling mechanism 50 may include an opening 96 formed in the flat surface 40A of the bearing 40. The expanding pin 90 is receivable within the opening or slot 96 formed in the bearing 40. During installation of the expanding pin 90 within the opening 96, a compressive force may be applied to the legs 94 opposing the biasing force thereof, such that the outer diameter defined by the plurality of legs 94 is less than a diameter of the opening 96. As shown, when the plurality of legs 94 are arranged within the opening 96, the resiliency of the legs 94 causes the plurality of legs 94 to flex or bend outwardly resulting in an outer diameter that is greater than the diameter of the opening 96. This increased dimension limits movement of the expanding pin 90, and therefore the bearing 44 relative to the opening 96 and bearing 40.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bearing assembly comprising:
   a first gear shaft aligned with a first axis;
   a second gear shaft aligned with a second axis, the second axis being oriented parallel to the first axis;
   a first bearing supported on the first gear shaft;
   a second bearing supported on the second gear shaft; and
   a coupling mechanism extending between and radially clamping the first bearing to the second bearing, wherein the coupling mechanism is operable to restrict relative axial movement and relative radial movement between the first bearing and the second bearing, the coupling mechanism including:
      a first portion mounted to the second bearing and protruding radially outwardly from the second bearing towards the first bearing, the first portion including a key body and a radial flange arranged near an end of the body;
      a second portion located at the first bearing, the second portion being configured to receive the first portion, the second portion including a keyhole having a non-uniform configuration extending between a first end and a second end thereof, the radial flange being receivable within the first end of the keyhole but not the second end of the keyhole.

2. The bearing assembly of claim 1, wherein the first bearing includes a first flat bearing surface and the second bearing includes a second flat bearing surface, the coupling mechanism being operable to restrict radial movement between the first flat bearing surface and the second flat bearing surface.

3. The bearing assembly of claim 2, wherein the coupling mechanism extends between the first flat bearing surface and the second flat bearing surface.

4. The bearing assembly of claim 1, wherein the coupling mechanism is spring-loaded.

5. The bearing assembly of claim 4, further comprising:
   a biasing member having a biasing force acting on the key; and
   a retaining clip movable relative to the key the retaining clip being operable to oppose the biasing force of the biasing member.

6. The bearing assembly of claim 5, wherein the retaining clip is in the engaged position when the key is inserted into a first end of the keyhole.

7. The bearing assembly of claim 1, wherein the first bearing and the second bearing are stationary bearings.

8. The bearing assembly of claim 1, wherein the first bearing and the second bearing are pressure loaded bearings.

9. A gear pump comprising:
   a housing having an inlet and an outlet;
   a first gear mounted within the housing to a first gear shaft;
   a second gear mounted within the housing to a second gear shaft;
   a first bearing supported on the first gear shaft;
   a second bearing supported on the second gear shaft; and
   a coupling mechanism extending between and radially clamping the first bearing to the second bearing, the coupling mechanism being operable to restrict relative axial movement and relative radial movement between the first bearing and the second bearing, the coupling mechanism including:
      a first portion mounted to the second bearing and protruding radially outwardly from the second bearing towards the secondfirst bearing, the first portion including a key body and a radial flange arranged near an end of the body;
      a second portion located at the first bearing, the second portion being configured to receive the first portion, the second portion including a keyhole having a non-uniform configuration extending between a first end and a second end thereof, the radial flange being receivable within the first end of the keyhole but not the second end of the keyhole.

10. The gear pump of claim 9, wherein the first bearing and the second bearing are stationary bearings.

11. The gear pump of claim 9, wherein the first bearing and the second bearing are pressure loaded bearings.

12. The gear pump of claim 9, wherein the first bearing includes a first flat bearing surface and the second bearing includes a second flat bearing surface, the coupling mechanism being operable to restrict relative radial movement between the first flat bearing surface and the second flat bearing surface.

* * * * *